June 3, 1969 D. E. GARRETT 3,448,044
PRESSURE-FOAM FRACTIONATION
Filed Feb. 15, 1968
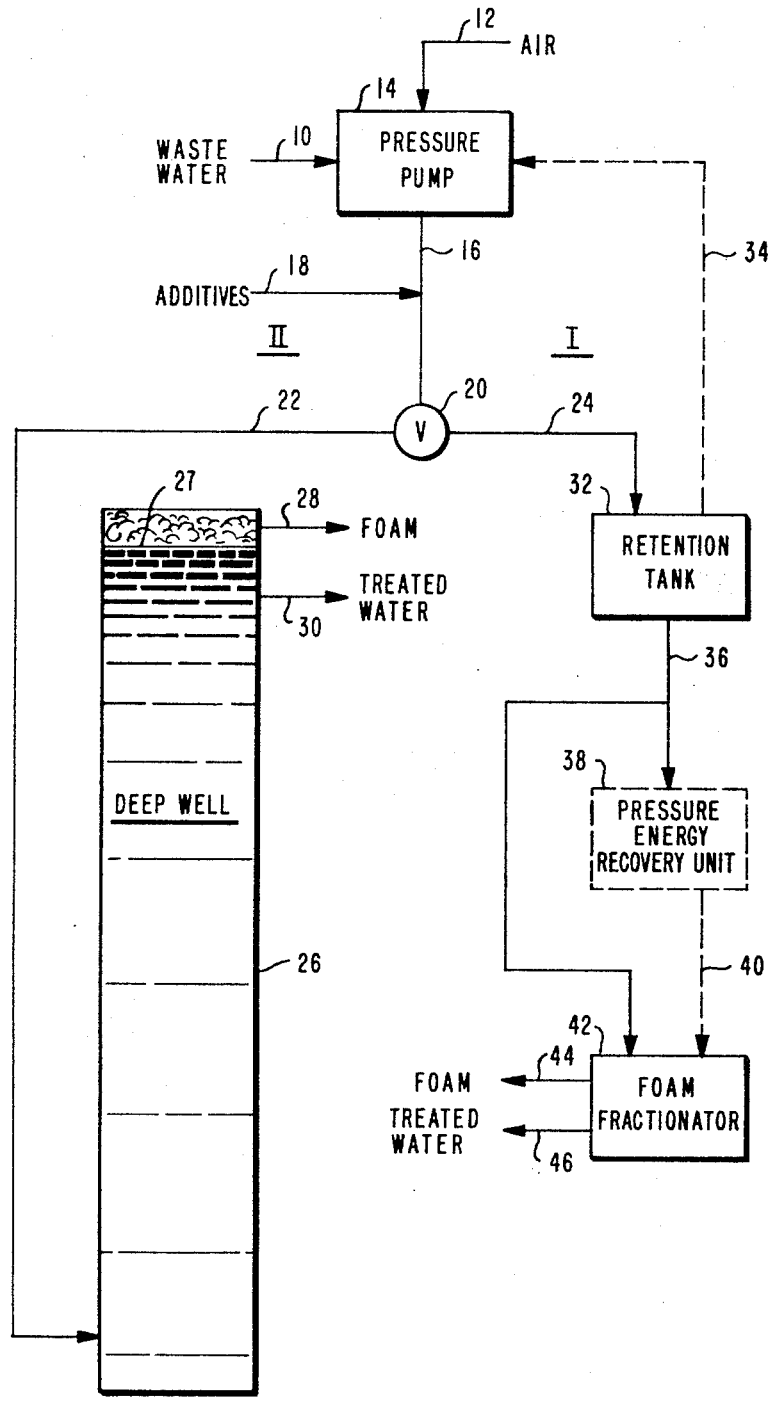
INVENTOR
DONALD E. GARRETT
BY
ATTORNEYS United States Patent Office 3,448,044
Patented June 3, 1969

3,448,044
PRESSURE-FOAM FRACTIONATION
Donald E. Garrett, 505 W. 9th St.,
Claremont, Calif. 91711
Filed Feb. 15, 1968, Ser. No. 705,699
Int. Cl. C02b 1/20; C02c 1/02; B01d 21/00
U.S. Cl. 210—44                                        9 Claims

ABSTRACT OF THE DISCLOSURE

A liquid treating process in which a pressurized admixture of liquid and gas is retained under superatmospheric pressure for a period of time sufficient to dissolve at least a portion of the gas in the liquid. The pressure is released from the pressurized admixture, and the resultant foam which is formed by the evolution of tiny bubbles of gas within the liquid carries impurities out of the body of liquid. The foam, containing the impurities, is separated from the body of liquid.

---

Considerable difficulty had previously been experienced in processing waste water so as to render it reusable. In particular considerable difficulty had previously been experienced in accomplishing the adequate removal of fine and colloidal particles, nitrates, phosphates, and both dissolved and suspended organic materials from waste water.

The present invention provides a method of effectively and inexpensively removing fines, colloidal particles, nitrates, phosphates, and both dissolved and suspended organic materials. This is accomplished rapidly and inexpensively.

This invention is applicable to the treatment of any liquid phase material but finds particular utility in the treatment of aqueous sewage and aqueous industrial wastes.

Broadly, this invention comprises the introduction of gas, such as air, into the liquid phase, generally aqueous wastes, and holding the resultant gas-liquid admixture for a predetermined residence time under high pressure. When the gas is air and the liquid phase is an aqueous material, this technique is effective in causing the dissolution of close to equilibrium quantities of air in the aqueous phase. Upon releasing the pressure a very fine and stable foam is formed which removes a large fraction of the undesirable material from the aqueous phase. The procedure of this invention is quite effective without the addition of additives or coagulants; however, the use of known additives in certain cases will cause the removal of additional objectionable material from the aqueous phase. Also, additives may be employed to promote foaming and to enhance the stability of the foam.

In the drawing a schematic flow diagram illustrates two embodiments of the process of this invention.

Referring to the drawing there is illustrated a liquid feed conduit 10 through which a liquid phase to be treated is conveyed to pressure pump 14. Gas feed conduit 12 conducts a gas phase to pressure pump 14 where it is admixed with the liquid phase in liquid feed conduit 10. Liquid-gas admixture conduit 16 conveys a pressurized admixture of the liquid and gas from pressure pump 14 to valve 20. Additive conduit 18 is provided to permit the introduction of additive substances to the liquid-gas admixture. Valve 20 may be positioned so as to direct the liquid-gas admixture in conduit 16 either into deep well conduit 22 and treatment according to Embodiment II or into retention tank conduit 24 and treatment by Embodiment I.

In Embodiment II the liquid-gas admixture passes from conduit 16 through valve 20 into deep well conduit 22 and into the bottom of deep well 26. The depth of deep well 26 is such that the required pressures and retention times are applied to the liquid-gas admixture in deep well 26 as the admixture rises from its point of injection to the surface 27 of the body of liquid in the deep well. Foam concentrate removal 28 accomplishes the withdrawal of the foam from surface 27. Treated liquid conduit 30 conveys the treated liquid away from deep well 26. The inlet to treated liquid conduit 30 is below surface 27.

When valve 20 is reversed and liquid-gas admixture flows from conduit 16 into retention tank conduit 24, it passes into retention tank 32 and is treated according to Embodiment I. The liquid-gas admixture is retained in retention tank 32 under a predetermined pressure and period of time to dissolve at least a portion of the gas in the liquid. The pressure is applied to retention tank 32 by pressure pump 14. Recycle conduit 34 is provided so that when the pressure has been raised to a desired predetermined level in the retention tank 32, the pressure is maintained at that level by recycling a stream of the admixture through conduit 34 to pump 14. The recycling action also serves to agitate the admixture while it is retained under pressure. Agitation aids in the dissolution of the gas phase in the liquid phase. After the admixture has been retained for the desired residence time in retention tank 32 it passes through pressurized admixture conduit 36 to foam fractionator 42. If it is desired to recover some of the pressure energy stored in the pressurized admixture, the pressurized admixture is passed through conduit 36 into pressure energy recovery unit 38. Energy recovery unit 38 is of a known type, such as, for example, a turbine. After passing through energy recovery unit 38, the stream passes through unpressurized admixture conduit 40 into foam fractionator 42. In foam fractionator 42 the foam is allowed to form as the dissolved gas evolves as tiny bubbles in the liquid and rises to the surface. Foam concentrate removal is accomplished at 44, and treated liquid conduit 46 conveys the treated liquid away from foam fractionator 42.

In the following examples, and in this disclosure, all parts and percentages are by weight unless otherwise indicated.

EXAMPLE I

A series of tests were carried out on samples of secondary sewage effluent. In each test the test sample of secondary sewage effluent was collected from the discharge stream of a secondary sewage treatment plant. The collected sample was treated within one-half hour after it was collected. Each sample was analyzed before and after treatment. The results of these analyses are tabulated in the following tables. In each test, air, at an ambient temperature of about 75 degrees Fahrenheit, was injected into a stream of the sample on the suction side of a positive displacement pump. The sample temperatures ranged from 50 degrees Fahrenheit to 60 degrees Fahrenheit. In each test the resulting air-water admixture was pressurized and pumped into a retention tank. Pressure was maintained at a constant level on the air-water admixture in the retention tank by recycling a stream of admixture from the retention tank to the positive displacement pump. Recycling also agitated the pressurized admixture. The proportions of air to sample and the retention pressures and times for each sample are tabulated in Table II. Where additives were used, they were added to the sample either prior to or at the same time as the air and were of the character and amount indicated in Table I. After the expiration of the retention period, each sample was drawn off into a foam release vessel where the admixture was allowed to reach equilibrium at atmospheric pressure. The air in solution in the samples was released with formation of many fine bubbles. The bubbles rose to the surface of the body of liquid collecting and carrying dissolved, suspended, and colloidal materials with them. The resultant foam concentrate was skimmed off the surface of the body of liquid.

In Table I, Tests 2-0, 3-0, 4-0, 5-0, 6-0, 7-0, 8-0, 9-10, and 10-1 are the original secondary effluent samples which were used in each of Tests 2, 3, 4, 5, 6, 7, 8, 9, and 10, respectively. The other test numbers represent samples of the treated water which were taken at various times from the body of liquid in the foam fractionator. The chemical oxygen demand referred to in Tables I and II is a standard test used in the analysis of sewage which provides a measure of the organics present in the sewage without indicating in any way the specific organic materials present. None of the nine samples listed in Tables I and II contain more than 25 percent of their chemical oxygen demand in the form of solids. At least 75 percent of the chemical oxygen demand in each of the samples was present as dissolved material. The nine samples, shown in Tables I and II, were taken at different times of the day and night from the same secondary sewage treatment plant.

TABLE I

Analysis, Secondary Sewage Effluent

| Test No. | Carbon, Milligrams per Liter | Chemical Oxygen Demand, Milligrams per Liter | Phosphorus, Milligrams per Liter | Additive, grams per Gallon of Effluent |
|---|---|---|---|---|
| 2-0 | 20.0 | 52.7 | | None. |
| 2-1 | 19.0 | 41.4 | | Do. |
| 2-2 | 26.0 | 40.1 | | Do. |
| 3-0 | 36.0 | | 5.14 | Do. |
| 3-1 | 24.0 | | | .22: ZnSO$_4$. |
| 3-2 | 16.0 | | 4.82 | .22: ZnSO$_4$. |
| 3-3 | 17.0 | | 4.00 | .22: ZnSO$_4$. |
| 4-0 | | 39.2 | | None. |
| 4-1 | | 37.2 | | Do. |
| 4-2 | | 37.0 | | Do. |
| 5-0 | | 50.9 | | Do. |
| 5-1 | | 44.5 | | Do. |
| 5-2 | | 47.0 | | Do. |
| 6-0 | | 62.6 | | Do. |
| 6-1 | | 51.3 | | Do. |
| 7-0 | | 46.8 | | Do. |
| 7-1 | | 29.8 | | Do. |
| 7-2 | | 31.8 | | Do. |
| 8-0 | | 36.6 | | Do. |
| 8-1 | | 51.5 | | .016: Petrofloat #11899 and .055: ZnSO$_4$. |
| 8-2 | | 28.5 | | Do. |
| 9-0 | | 40.7 | | None. |
| 9-1 | | 31.5 | | .014: FeCl$_3$.6H$_2$O. |
| 9-2 | | 31.0 | | .014: FeCl$_3$.6H$_2$O. |
| 9-3 | | 28.4 | | .014: FeCl$_3$.6H$_2$O. |
| 10-1 | | 34.4 | 8.2 | None. |
| 10-2 | | 40.6 | 2.9 | .038: FeCl$_3$. |
| 10-3 | | 22.7 | 1.3 | .028: FeCl$_3$. |
| 10-4 | | 22.3 | 3.2 | .028: FeCl$_3$. |

The tests in Example I may be repeated as continuous operations using a plurality of retention tanks of such capacity that the flow rates through the tanks provide the required retention times, and in each case the treated effluent will contain substantially less obectionable material than it contained before treatment. The tests in Example I may be repeated with excellent results in each case by injecting the pressurized air-water admixture into the bottom of a deep well instead of into a retention tank. The head of liquid above the injection point in the well is such that the admixture will be retained under the required pressure for the required period of time as it rises toward the top of the well.

As illustrated in the above examples, the percentage reduction in chemical oxygen demand generally increases with an increase in pressure or retention time. At higher pressures and retention times substantial amounts of dissolved organics are removed by this treatment.

The known water treatment additives which may be employed to promote the formation of floc and as coagulants include; for example, iron chloride iron sulphate, alum, zinc sulphate, and the like.

In general the effective removal of objectionable materials from the liquid phase, according to this invention, is not accomplished below a pressure of about 100 pounds per square inch gauge, and preferably a pressure of at least 150 pounds per square inch gauge is employed. The amount of pressure which may be applied is limited only by capability of the equipment and the difficulty of achieving and maintaining excessively high pressures. In general pressures in excess of about 400 pounds per square inch gauge do not effect any substantial improvement in the removal of objectonable material and require excessively heavy equipment.

The period of time for which a gas-liquid admixture is retained under the desired pressure should be at least five minutes and preferably at least about 10 minutes. In general better removal of the objectionable material is obtained with an increase in retention time of up to about 25 minutes. In general the liquid phase is substantially saturated with dissolved gas with a retention time of from 20 to 25 minutes. Some small advantage is generally obtained by allowing the admixture to remain pressurized until the liquid phase is fully saturated with the gas phase; however, the increased equipment size necessary to accomplish this additional period of retention, where a large volume of liquid is being treated on a continuous basis, generally renders this impractical.

Agitating the liquid-gas admixture during the period when it is retained under pressure promotes the dissolution of the gas phase in the liquid phase. This is conveniently

TABLE II

| | Treatment Conditions | | | Analysis, Treated Water | | |
|---|---|---|---|---|---|---|
| Test No. | Retention Pressure, Pounds per Square Inch, Guage | Amount Air, Volume Percentage of Effluent | Total Retention Time Minutes | Percentage Reduction in Reduction in Carbon | Percentage Reduction in Chemical Oxygen Demand | Percentage Reduction in Phosphorus |
| 2-1 | 175 | 18 | 8 | 5.0 | 21.4 | |
| 2-2 | 175 | 18 | 8 | | 23.9 | |
| 3-1 | 175 | 18 | 12 | 33.3 | | |
| 3-2 | 175 | 18 | 12 | 55.6 | | 6.2 |
| 3-3 | 175 | 18 | 12 | 52.8 | | 22.2 |
| 4-1 | 150-160 | 13 | 8 | | 5.1 | |
| 4-2 | 150-160 | 13 | 8 | | 5.6 | |
| 5-1 | 175 | 14 | 10 | | 12.6 | |
| 5-2 | 175 | 14 | 10 | | 7.7 | |
| 6-1 | 185 | 10 | 8 | | 18.0 | |
| 7-1 | 185 | 22 | 14 | | 36.3 | |
| 7-2 | 185 | 22 | 14 | | 32.0 | |
| 8-1 | 175-185 | 15 | 12 | | | |
| 8-2 | 175-185 | 15 | 12 | | 22.1 | |
| 9-1 | 175-185 | 13 | 10 | | 22.6 | |
| 9-2 | 175-185 | 13 | 10 | | 23.8 | |
| 9-3 | 175-185 | 13 | 10 | | 30.2 | |
| 10-2 | 185 | 15 | 10.5 | | 45.0 | 64.6 |
| 10-3 | 185 | 15 | 10.5 | | 39.3 | 86.1 |
| 10-4 | 185 | 15 | 10.5 | | 40.4 | 61.5 | accomplished by recirculation of a portion of the pressurized admixture to a positive displacement pump. According to this procedure, the positive displacement pump serves not only to pressurize the admixture but also to agitate it.

The admixture containing dissolved gas is allowed to stand, after the pressure has been removed, for a period of at least about five minutes to permit the evolution of a substantial portion of the dissolved gas. In general, substantially all the gas which is going to evolve will have evolved after a period of about 20 minutes. The unpressurized admixture may be agitated somewhat by recirculation at the bottom of the liquid body to promote the evolution of gas. If desired, a vacuum may be applied to the unpressurized admixture to promote the evolution of gas from the liquid.

This invention is particularly useful when applied to secondary sewage effluent which has already been treated once but is not reusable without further cleaning.

Because of the very large volumes of liquid and gas which are involved when sewage is being treated with air, it is generally not feasible to adjust the temperature of either the liquid or gas phases. For this reason, it may be necessary to adjust the length of the retention period and the pressure under which the admixture is retained to accomplish the dissolution of a sufficient amount of gas in the liquid phase. In general, as the temperature of the liquid phase decreases the pressure and retention times are increased to accomplish the same degree of treatment obtained at higher liquid phase temperatures.

The separation of the foam from the body of treated liquid is accomplished by conventional means; such as, for example, skimming, floating over a weir, and the like.

The quantity of gas employed should, in general, be equal to or greater than the amount of gas which the liquid could hold at saturation under the conditions of temperature and pressure involved. In general the amount of gas dissolved in the liquid should be equal to at least about 50 percent of the saturation amount and preferably at least about 75 percent of the saturation amount.

What has been described are preferred embodiments of this invention in which modifications and changes may be made without departing from the spirit and scope of the accompanying claims.

What is claimed is:

1. A process comprising:
   applying pressure to an admixture of gas and liquid to provide a pressurized admixture of gas and liquid;
   retaining said pressurized admixture of gas and liquid for a period of at least five minutes at a pressure of at least 100 pounds per square inch, gauge;
   agitating said pressurized admixture for at least a portion of said period, whereby at least a portion of said gas dissolves in said liquid;
   releasing said pressure from said admixture;
   allowing said unpressurized admixture to stand without substantial agitation until the evolution of gas substantially ceases; and
   separating the resultant foam from the surface of said liquid.

2. The process of claim 1 including recovering pressure energy from said admixture when said pressure is released.

3. The process of claim 1 wherein said admixture is pressurized to a pressure of from about 100 to 400 pounds per square inch, gauge.

4. The process of claim 1 wherein said admixture is subjected to said pressure for a period of from about 5 to 20 minutes.

5. The process of claim 1 including providing a flocculant in said pressurized admixture.

6. The process of claim 1 wherein said gas is air and said liquid is aqueous sewage.

7. The process of claim 1 including providing a foaming agent in said pressurized admixture.

8. A process comprising:
   admixing a gas phase and a liquid phase to produce a liquid-gas admixture;
   introducing a stream of said admixture at a depth below the surface of a body of said liquid, said depth being sufficient to pressurize said admixture to a pressure of at least 100 pounds per square inch and retain said admixture under said pressure for a period of at least five minutes, whereby at least a portion of said gas dissolves in said liquid;
   releasing said pressure from said admixture by allowing said admixture to rise through said body of liquid to a region of reduced pressure; and
   separating the resultant foam from said surface.

9. The process of claim 8 wherein said body of liquid is confined in a deep well and said stream of admixture is introduced at about the bottom of said well.

References Cited

UNITED STATES PATENTS

| 2,765,919 | 10/1956 | Juell | 210—44 |
| 2,793,185 | 5/1957 | Albrektsson et al. | 210—44 |
| 3,175,687 | 3/1965 | Jones | 210—44 X |
| 3,352,420 | 11/1967 | Krofta | 210—221 X |

FOREIGN PATENTS

| 797,158 | 6/1958 | Great Britain. |
| 955,321 | 4/1964 | Great Britain. |
| 1,327,422 | 4/1963 | France. |

MICHAEL E. ROGERS, *Primary Examiner.*

U.S. Cl. X.R.
166—42; 210—13